(12) United States Patent
Iwamura et al.

(10) Patent No.: US 9,894,566 B2
(45) Date of Patent: *Feb. 13, 2018

(54) MOBILE COMMUNICATION METHOD AND RADIO BASE STATION

(75) Inventors: Mikio Iwamura, Yokohama (JP); Minami Ishii, Yokohama (JP)

(73) Assignee: NTT DOCOMO, INC., Tokyo (JP)

(*) Notice: Subject to any disclaimer, the term of this patent is extended or adjusted under 35 U.S.C. 154(b) by 55 days.

This patent is subject to a terminal disclaimer.

(21) Appl. No.: 13/139,236

(22) PCT Filed: Dec. 10, 2009

(86) PCT No.: PCT/JP2009/070686
§ 371 (c)(1),
(2), (4) Date: Aug. 15, 2011

(87) PCT Pub. No.: WO2010/067841
PCT Pub. Date: Jun. 17, 2010

(65) Prior Publication Data
US 2011/0292790 A1    Dec. 1, 2011

(30) Foreign Application Priority Data

Dec. 11, 2008   (JP) ................................ 2008-316122

(51) Int. Cl.
H04B 7/04      (2017.01)
H04J 11/00     (2006.01)
H04W 36/00    (2009.01)

(52) U.S. Cl.
CPC .............................. H04W 36/0033 (2013.01)

(58) Field of Classification Search
USPC .................................................. 455/436, 414
See application file for complete search history.

(56) References Cited

U.S. PATENT DOCUMENTS

2008/0261600 A1* 10/2008 Somasundaram et al. ... 455/436
2009/0061878 A1*  3/2009 Fischer ......................... 455/436

(Continued)

FOREIGN PATENT DOCUMENTS

JP    3-013132 A    1/1991
JP    9-009332 A    1/1997

(Continued)

OTHER PUBLICATIONS

3GPP TS 36.300 V8.6.0, Sep. 2008, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); p. 40 and pp. 49-53, 7 pages.

(Continued)

Primary Examiner — Kevin C Harper
Assistant Examiner — Derrick V Rose
(74) Attorney, Agent, or Firm — Osha Ling LLP

(57) ABSTRACT

A mobile communication method involving performing, at a mobile station UE which establishes a first connection in a first cell, a cell selection process at the time of detecting a failure in the first connection, transmitting, from the mobile station UE to a second cell selected in the cell selection process, a connection re-establishment request signal, determining, at a radio base station that manages the second cell, whether or not to store context information of the mobile station UE in response to the connection re-establishment request signal, acquiring, at the radio base station, the context information of the mobile station UE from a radio base station that manages the first cell, when determining that the context information of the mobile station UE is not stored, and establishing a second connection in the second cell for the mobile station UE, based on the context information of the mobile station UE.

4 Claims, 11 Drawing Sheets

(56) References Cited

U.S. PATENT DOCUMENTS

| | | | |
|---|---|---|---|
| 2009/0135775 A1* | 5/2009 | Ou et al. ................. | 370/329 |
| 2009/0149162 A1* | 6/2009 | Tenny ..................... | 455/414.1 |
| 2009/0191874 A1* | 7/2009 | Du ........................ | H04W 36/18 |
| | | | 455/436 |

FOREIGN PATENT DOCUMENTS

| | | |
|---|---|---|
| JP | 2001-258059 A | 9/2001 |
| WO | 2007/148935 A1 | 12/2007 |
| WO | 2008/131401 A1 | 10/2008 |

OTHER PUBLICATIONS

Patent Abstracts of Japan, Publication No. 2001-258059, dated Sep. 21, 2001, 1 page.
3GPP TS 36.321 V8.3.0, Sep. 2008, "3rd Generation Partnership Project; Technical Specification Group Radio Access Network; Evolved Universal Terrestrial Radio Access (E-UTRA) Medium Access Control (MAC) protocol specification (Release 8)," 36 pages.
3GPP TS 36.331 V8.3.0, Sep. 2008, "3rd Generation Partnership Project; Technical Specification Group Radio Access Network; Evolved Universal Terrestrial Radio Access (E-UTRA) Radio Resource Control (RRC); Protocol specification (Release 8)," 178 pages.
Office Action dated Feb. 10, 2010 in corresponding Japanese Application No. 2008-316122, with translation, 7 pages.
Office Action dated Jul. 2, 2010 in corresponding Japanese Application No. 2008-316122, with translation, 5 pages.
International Search Report issued in PCT/JP2009/070686, dated Feb. 23, 2010, w/translation, 4 pages.
Written Opinion issued in PCT/JP2009/070686, dated Feb. 23, 2010, with translation, 8 pages.
International Preliminary Report on Patentability issued in PCT/JP2009/070686, dated Jul. 5, 2011, with translation, 10 pages.
Extended European Search Report for European Application No. 09831945.2 dated Apr. 16, 2012 (11 pages).
3GPP TSG-RAN WG2#61 Tdoc R2-081170; "Radio Link Failure Recovery on Non Prepared eNB"; Sorrento, Italy, Feb. 11, 2008 (8 pages).
3GPP TSG RAN WG2 Meeting #61bis, R2-081623, "RRC Re-Establishment Procedure"; Shenzhen, China, Mar. 31, 2008 (2 pages).
Notice of Grounds for Rejection in corresponding Japanese application No. 2009-269237 dated Jul. 16, 2013 (5 pages).
Office Action in corresponding Chinese application No. 200980149869.X dated Jul. 18, 2013 (9 pages).

* cited by examiner

FIG. 3

– ShortMAC-I
The IE ShortMAC-I is used to identify and verify the UE at RRC connection re-establishment.

ShortMAC-I information element

```
-- ASN1START

ShortMAC-I ::=        BIT STRING ( SIZE (16) )

-- ASN1STOP
```

ShortMAC-I field descriptions

| |
|---|
| ShortMAC-I<br>The 16 least significant bits of the MAC-I calculated using the security configuration of the source cell, as specified in 5.3.7.4. |

– VarShortMAC-Input
The UE variable VarShortMAC-Input specifies the input used to generate the shortMAC-I. The UE shall store the variable in accordance with the ASN.1 specified in the following.

VarShortMAC-Input UE variable

```
-- ASN1START

VarShortMAC-Input ::=     SEQUENCE {
    cellIdentity                CellIdentity,
    physicalCellIdentity        PhysicalCellIdentity,
    c-RNTI                      C-RNTI
}

-- ASN1STOP
```

VarShortMAC-Input field descriptions

| |
|---|
| cellIdentity<br>Set to CellIdentity of the current cell. |
| physicalCellIdentity<br>Set to PhysicalCellIdentity of the cell the UE was connected to prior to the failure. |
| c-RNTI<br>Set to C-RNTI that the UE had in the cell it was connected to prior to the failure. |

FIG. 4

- AS-Context

The IE AS-Context is used to tansfer local E-UTRAN context required by the target node.

AS-Context information element

```
-- ASN1START

As-Context ::=                    SEQUENCE {
    ue-RadioAccessCapabilityInfo      OCTET STRING ( CONTAINING UECapabilityInformation ),
    ue-SecurityCapabilityInfo         OCTET STRING,
    reestabishmentInfo                ReestablishmentInfo
}

-- ASN1STOP
```

| AS-Context field descriptions |
|---|
| ue-RadioAccessCapabilityInfo<br>Including E-UTRA, GERAN and UTRA radio acess capabilities (separated) |
| ue-SecurityCapabilityInfo<br>UE security capability information as specified in TS 36.413 [39]. |
| reestablishmentInfo<br>Including information needed for the RRC connection re-establishment |

- ReestablishmentInfo

The ReestablishmentInfo IE contains information needed for the RRC connection re-establishment.

ReestablishmentInfo information element

```
-- ASN1START

ReestablishmentInfo ::=           SEQUENCE {
    sourcePhysicalCellIdentity        PhysicalCellIdentity,
    targetCellShortMAC-I              ShortMAC-I,
    additionalReestabInfoList         AdditionalReestabInfoList          OPTIONAL,
    ...
}

AdditionalReestabInfoList ::=     SEQUENCE ( SIZE (1..maxReestabInfo ) ) OF SEQUENCE {
    cellIdentity                      CellIdentity,
    key-eNodeB-Star                   Key-eNodeB-Star,
    shortMAC-I                        ShortMAC-I
}
-- ASN1STOP
```

| ReestablishmentInfo field descriptions |
|---|
| sourcePhysicalCellIdentity<br>The physical cell identity of the source cell, used to determine the UE context in the target eNB at re-establishment. |
| targetCellShortMAC-I<br>The ShortMAC-I for the handover target cell, in order for potential re-establishment to succeed. |
| additionalReeatabInfoList<br>Contains a list of ShortMAC-I and KeNB* for cells under control of the target eNB, required for potential re-establishment by the UE in these cells to succeed. |

FIG. 5

– RRCConnectionReestablishmentRequest
The RRCConnectionReestablishmentRequest message is used to request the reestablishment of an RRC connection.
Signalling radio bearer: SRB0
RLC-SAP: TM
Logical channel: CCCH
Direction: UE to E-UTRAN RRCConnectionReestablishmentRequest message

```
-- ASN1START

RRCConnectionReestablishmentRequest ::=   SEQUENCE {
    criticalExtensions                       CHOICE {
        rrcConnectionReestablishmentRequest-r8
                                             RRCConnectionReestablishmentRequest-r8-IEs,
        criticalExtensionsFuture             SEQUENCE {}
    }
}

RRCConnectionReestablishmentRequest-r8-IEs ::= SEQUENCE {
    ue-Identity                              ReestabUE-Identity,
    reestablishmentCause                     ReestablishmentCause,
    spare                                    BIT STRING ( SIZE (2) )
}

ReestabUE-Identity ::=                    SEQUENCE {
    c-RNTI                                   C-RNTI,
    physCellIdentity                         PhysicalCellIdentity,
    shortMAC-I                               ShortMAC-I
}

ReestablishmentCause ::=                  ENUMERATED {
                                             reconfigurationFailure, handoverFailure,
                                             otherFailure, spare }

-- ASN1STOP
```

| RRCConnectionReestablishmentRequest field descriptions |
|---|
| ue-Identity |
| UE identity included to retrieve UE context and to facilitate contention resolution by lower layers |
| ReestablishmentCause |
| Indicates the failure cause that triggered the re-establishment procedure. |
| physCellIdentity |
| The Physical Cell Identity of the cell the UE was connected to prior to the failure. |

FIG. 6

HANDOVER PREPARATION INFORMATION

E-UTRA RRC information used by the target eNB during handover preparation, including UE capability information
Transfer characteristics: tbs HandoverPreparationInformation message

```
-- ASN1START

HandoverPreparationInformation ::=    SEQUENCE {
    criticalExtensions        CHOICE {
        c1              CHOICE {
            handoverPreparationInformation-r8    HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

HandoverPreparationInformation-r8-IEs ::= SEQUENCE {
    as-Configuration                             OPTIONAL,
    rrm-Configuration                            OPTIONAL,
    as-Context,
    nonCriticalExtention    SEQUENCE {}          OPTIONAL,
}

-- ASN1STOP
```

| HandoverPreparationInformation field descriptions |
|---|
| as-Configuration<br>The complete radio resource configuration. Applicable in case of intra-E-UTRA handover. |
| rrm-Configuration<br>Local E-UTRAN context used depending on the target node's implementation, which is mainly used for the RRM purpose. FFS if applicable for Inter-RAT HO |
| as-Cotext<br>Local E-UTRAN context required by the target node. |

FIG. 7

AS-Configuration

The AS-Configuration IE contains information about RRC configuration information in the source cell which can be utilized by target cell to determine the need to change the RRC configuration during the handover preparation phase. The information can also be used after the handover is successfully performed or during the RRC connection re-establishment.

AS-Configuration information element

```
-- ASN1START

AS-Configuration ::=        SEQUENCE {
    sourceMeasurementConfiguration      MeasurementConfiguration,
    sourceRadioResourceConfiguration    RadioResourceConfigDedicated,
    sourceSecurityConfiguration         SecurityConfiguration,
    sourceUE-Identity                   C-RNTI,
    sourceMasterInformationBlock        MasterInformationBlock,
    sourceSystemInformationBlockType1   SystemInformationBlockType1,
    sourceSystemInformationBlockType2   SystemInformationBlockType2,
    antennaInformationCommon            AntennaInformationCommon,
    ...
}

-- ASN1STOP
```

NOTE  The AS-Configuration re-uses information elements primarily created to cover the radio interface signalling requirements. Consequently, the information elements may include some parameters that are not relevant for the target eNB e.g. the SFN as included in the MasterInformationBlock.

| AS-Configuration field descriptions |
|---|
| sourceMeasurementConfiguration<br>Measurement configuration in the source cell. The measurement configuration for all measurements existing in the source cell when handover is triggered shall be included. See 10.5. |
| sourceRadioResourceConfiguration<br>Radio configuration in the source cell. The radio resource configuration for all radio bearers existing in the source cell when handover is triggered shall be included. See 10.5. |
| sourceSecurityConfiguration<br>This field provides the AS integrity protection (CP) and AS ciphering (CP and UP) configuration and the next hop chaining count used in the source cell. |
| sourceMasterInformationBlock<br>MasterInformationBlock transmitted in the source cell. |
| sourceSystemInformationBlockType1<br>SystemInformationBlockType1 transmitted in the source cell. |
| sourceSystemInformationBlockType2<br>SystemInformationBlockType2 transmitted in the source cell. |
| antennaInformationCommon<br>This field provides information about the number of antenna ports the source cell. |

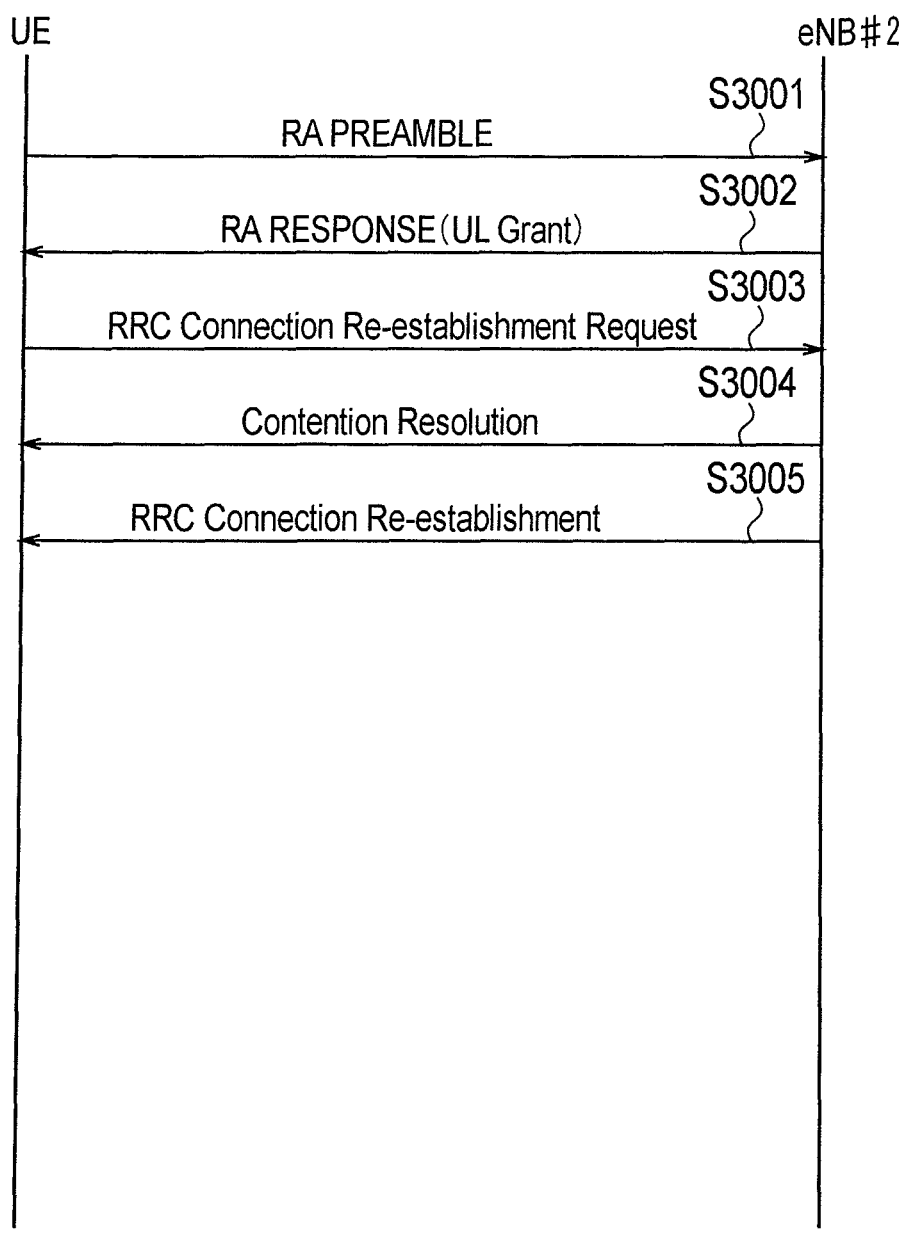

MOBILE COMMUNICATION METHOD AND RADIO BASE STATION

TECHNICAL FIELD

The present invention relates to a mobile communication method and a radio base station.

BACKGROUND ART

With reference to FIG. 12, an operation performed when a mobile station UE that establishes an RRC connection #1 in a cell #1 detects an RLF (Radio Link Failure), in a mobile communication system of the "LTE (Long Term Evolution)" scheme defined by the 3GPP, will be explained.

As illustrated in FIG. 12, in a state where the RRC connection #1 is established between the mobile station UE and the radio base station eNB#1, and an S1 connection #1 is established between the radio base station eNB#1 and a mobile switching center MME, when the mobile station UE detects the RLF (Radio Link Failure) in step S5001, the mobile station UE performs a cell selection process (Cell Selection) in step S5002.

In step S5003, the mobile station UE transmits an "RRC Connection Re-establishment Request" to a radio base station eNB#2 that manages a cell #2 selected in the cell selection process.

In step S5004, when the radio base station eNB#2 stores context information (UE context) of the mobile station UE corresponding to a "Physical Cell Identity", a "C-RNTI", and a "shortMAC-I" included in the received "RRC Connection Re-establishment Request", then the radio base station eNB#2 transmits an "RRC Connection Re-establishment" to the mobile station UE in step S5005.

In step S5006, the mobile station UE transmits an "RRC Connection Re-establishment Complete" to the radio base station eNB#2.

In step S5007, the radio base station eNB#2 transmits an "S1 Path Switch" to the mobile switching center MME, and in step S5008, the mobile switching center MME transmits an "RRC Connection Reconfiguration" to the mobile station UE.

In step S5009, the mobile station UE transmits an "RRC Connection Reconfiguration Complete" to the radio base station eNB#2, and in step S5010, the mobile switching center MME transmits an "S1 Path Switch Ack" to the radio base station eNB#2.

This completes switching of the RRC connection #1 to the RRC connection #2 and switching of the S1 connection #1 to the S1 connection #2. In this case, the RRC connection #2 is an RRC connection established between the mobile station UE and the radio base station eNB#2, and the S1 connection #2 is an S1 connection established between the radio base station eNB#2 and the mobile switching center MME.

However, in such a mobile communication system, the mobile station UE is configured to perform handover only to the cell controlled by the radio base station eNB in which the context information of the mobile station UE (UE context) is stored.

Therefore, there is a problem that when the above-described radio base station eNB#2 does not store the context information of the mobile station UE, then the above-described "RRC Connection Re-establishment" is denied, and thus, the mobile station UE cannot establish the RRC connection #2 with the radio base station eNB#2 that manages the cell #2 selected in the cell selection process.

Therefore, the present invention is intended to overcome the above-described problem. An object of the present invention is to provide a mobile communication method and a radio base station enabling a connection re-establishment (re-connection) to a radio base station in which context information of a mobile station is not stored.

SUMMARY OF THE INVENTION

A first aspect of the present invention is summarized as a mobile communication method, including the steps of: (A) performing, at a mobile station which establishes a first connection in a first cell, a cell selection process upon detecting a failure in the first connection; (B) transmitting, from the mobile station to a second cell selected in the cell selection process, a connection re-establishment request signal; (C) determining, at a radio base station that manages the second cell, whether or not stored context information of the mobile station exists, in response to the "connection re-establishment request signal; (D) acquiring, at the radio base station that manages the second cell, the context information of the mobile station from a radio base station that manages the first cell, when determining that the context information of the mobile station is not stored; and (E) establishing, at the radio base station that manages the second cell and the mobile station, a second connection in the second cell for the mobile station, based on the context information of the mobile station.

A second aspect of the present invention is summarized as a radio base station that manages a second cell, including: a determination unit configured to determine whether or not to store context information of a mobile station in response to a connection re-establishment request signal destined to the second cell received from the mobile station wherein the mobile station has established a first connection in a first cell; an acquiring unit configured to acquire, when it is determined by the determination unit that the context information of the mobile station is not stored, the context information of the mobile station from a radio base station that manages the first cell; and an establishment unit configured to establish a second connection in the second cell for the mobile station in cooperation with the mobile station, based on the context information of the mobile station.

As explained above, according to the present invention, it is possible to provide a mobile communication method and a radio base station enabling a connection re-establishment (re-connection) to a radio base station in which context information of a mobile station is not stored.

BRIEF DESCRIPTION OF THE DRAWINGS

FIG. 3 is a diagram explaining a "shortMAC-I" used in the mobile communication system according to the first embodiment of the present invention.

FIG. 4 is a diagram explaining an "AS-Context" used in the mobile communication system according to the first embodiment of the present invention.

FIG. 5 is a diagram explaining an "RRC Connection Re-establishment Request" used in the mobile communication system according to the first embodiment of the present invention.

FIG. 6 is a diagram explaining an "X2 HO Preparation" used in the mobile communication system according to the first embodiment of the present invention.

FIG. 7 is a diagram explaining an "AS-Configuration" included in the "X2 HO Preparation" used in the mobile communication system according to the first embodiment of the present invention.

FIG. 9 is a sequence chart showing an operation of the mobile communication system according to a first modification of the present invention.

DETAILED DESCRIPTION (Configuration of Mobile Communication System According to First Embodiment of the Present Invention)

With reference to FIG. 1 to FIG. 7, the configuration of a mobile communication system according to a first embodiment of the present invention will be explained.

Figure 1:
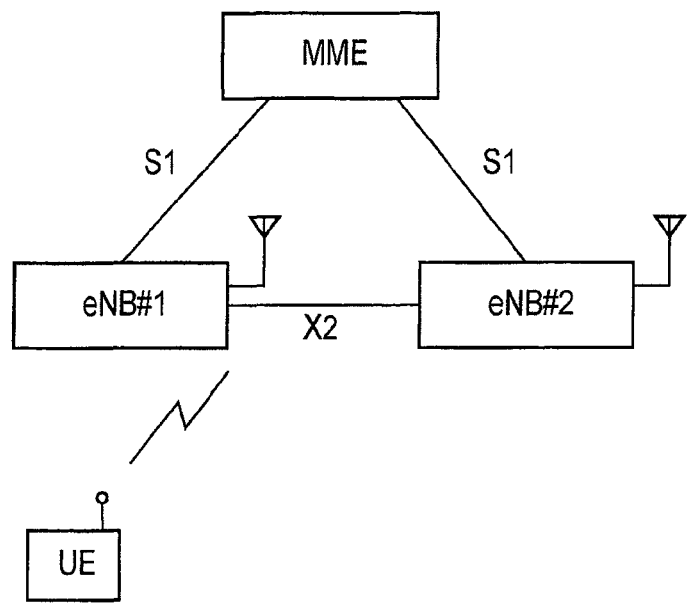
FIG. 1 is a diagram showing the entire configuration of a mobile communication system according to a first embodiment of the present invention.

As illustrated in FIG. 1, the mobile communication system according to this embodiment is a mobile communication system of the LTE scheme, and includes a mobile switching center MME, a radio base station eNB#1 that manages a cell #1, and a radio base station eNB#2 that manages a cell #2.

In the mobile communication system, a mobile station UE is configured to be capable of performing handover only to a cell controlled by the radio base station eNB in which context information of the mobile station UE is stored. That is, the "Backward Handover" is applied.

However, the present invention can be applied not only to the mobile communication system of the LTE scheme but also to an arbitrary mobile communication system to which the "Backward Handover" is applied.

Figure 2:
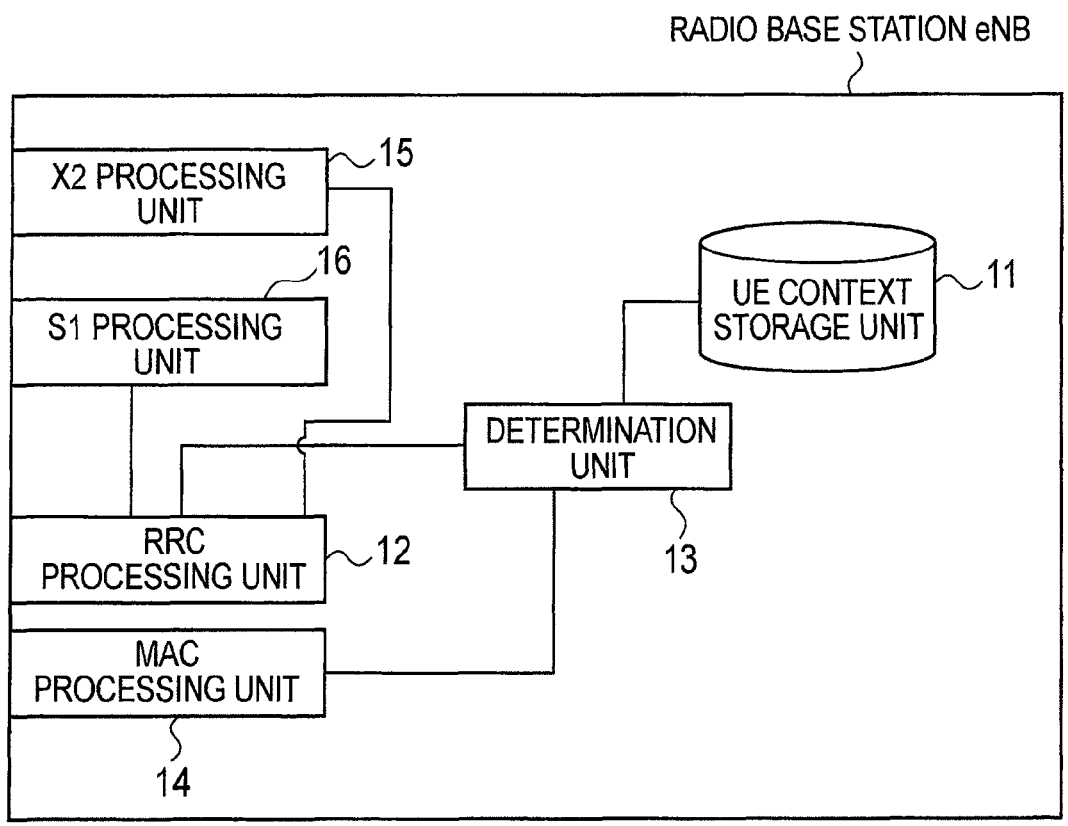
FIG. 2 is a functional block diagram of a radio base station according to the first embodiment of the present invention.

As illustrated in FIG. 2, the radio base station eNB includes a US context storage unit 11, an RRC (Radio Resource Control) processing unit 12, a determination unit 13, an MAC (Media Access Control) processing unit 14, an X2 processing unit 15, and an S1 processing unit 16. Hereinafter, the configuration of the radio base station eNB#2, representing the radio base station eNB, which manages the cell #2 (second cell) will be explained.

The UE context storage unit 11 is configured to store a "shortMAC-I" capable of uniquely specifying the mobile station UE, and the context information of the mobile station UE, in association with each other.

Here, the "shortMAC-I" is a 16-bit, security parameter generated by using a "VarShortMAC-Input" that includes a "cell ID", a "PCI (Physical Cell ID)", and a "C-RNTI", as illustrated in FIG. 3.

Specifically, the "shortMAC-I" is formed by extracting lower 16 bits of a falsification "MAC-I" calculated for the "VarShortMAC-Input" by using a security key and a security algorithm that the mobile station UE currently uses.

The context information of the mobile station UE includes, for example, an "AS-Context" including a "ue-RadioAccessCapabilityInfo", a "ue-SecurityCapabilityInfo", or a "reestablishmentInfo", as illustrated in FIG. 4.

The RRC processing unit 12 is configured to perform an RRC process, in cooperation with an RRC function of the mobile station UE.

For example, the RRC processing unit 12 is configured to receive an "RRC Connection Re-establishment Request (connection re-establishment request signal)", an "RRC Connection Re-establishment Complete (connection re-establishment completion signal)", or an "RRC Connection Reconfiguration Complete (connection reconfiguration completion signal)" destined to a cell (for example, the cell #2) under the control of the radio base station eNB#2, from the mobile station UE.

The RRC processing unit 12 is also configured to transmit an "RRC Connection Re-establishment (connection re-establishment signal)" or an "RRC Connection Reconfiguration (connection reconfiguration signal)" to the mobile station UE.

In addition, the RRC processing unit 12 is configured to establish an RRC connection #2 in the cell #2 for the mobile station UE, by exchanging the above-described RRC message in cooperation with the mobile station UE, i.e., with the mobile station UE, based on the context information of the mobile station UE.

Here, an example of a format of the "RRC Connection Re-establishment Request" is illustrated in FIG. 5.

The determination unit 13 is configured to determine whether or not the context information of the mobile station UE is stored in the UE context storage unit 11 in response to the "RRC Connection Re-establishment Request" received by the RRC processing unit 12.

Specifically, the determination unit 13 is configured to determine whether or not the context information of the mobile station UE corresponding to the "Physical Cell Identity", the "C-RNTI", and the "shortMAC-I" included in the "RRC Connection Re-establishment Request" received by the RRC processing unit 12 is stored in the UE context storage unit 11.

The MAC processing unit 14 is configured to perform an MAC process, in cooperation with an MAC function of the mobile station UE.

The X2 processing unit 15 is configured to serve an interface function with another radio base station (for example, the radio base station eNB#1).

For example, the X2 processing unit 15 is configured to acquire the context information of the mobile station UE from the radio base station eNB#1 that manages the cell #1, when it is determined by the determination unit 13 that the context information of the mobile station UE is not stored.

Specifically, the X2 processing unit 15 is configured to acquire the context information of the mobile station UE via an "X2 HO Preparation (handover preparation signal)" by transmitting a "Forward HO Request (forward handover request signal)" to the radio base station eNB#1, when it is determined by the determination unit 13 that the context information of the mobile station UE is not stored.

Herein, in FIG. 6 and FIG. 7, an example of a format of the "X2 HO Preparation" is illustrated.

The S1 processing unit 16 is configured to serve an interface function with the mobile switching center MME. The S1 processing unit 16 is configured to perform a management of establishing the S1 connection with the mobile switching center MME.

For example, the S1 processing unit 16 is configured to transmit an "S1 Path Switch" to the mobile switching center MME and to receive an "S1 Path Switch Ack" from the mobile switching center MME.

(Operation of the Mobile Communication System According to the First Embodiment of the Present Invention)

Figure 8:
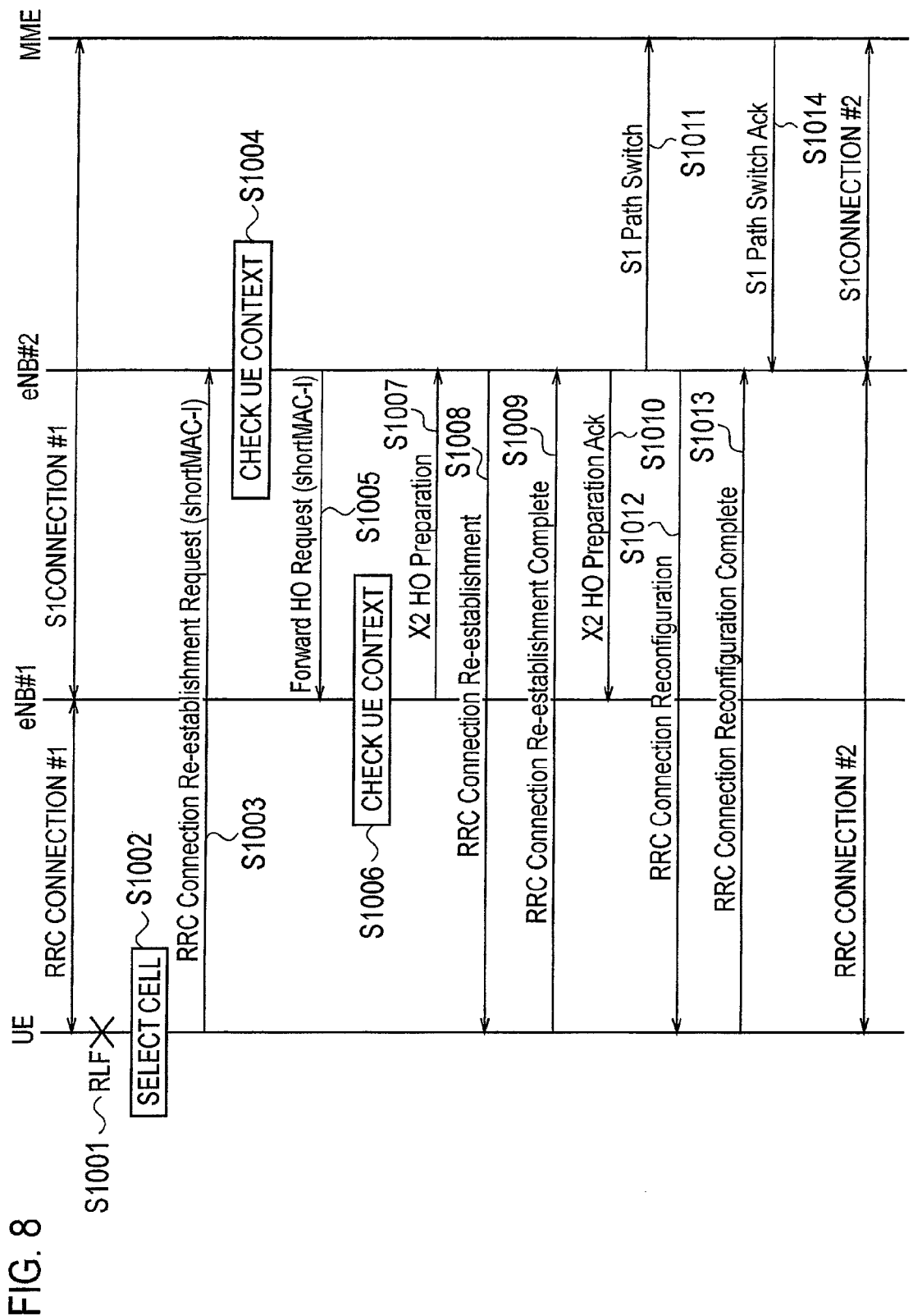
FIG. 8 is a sequence chart showing an operation of the mobile communication system according to the first embodiment of the present invention.

With reference to FIG. 8, an operation of the mobile communication system according to the first embodiment of the present invention will be explained.

As illustrated in FIG. 8, in a state where an RRC connection #1 is established between the mobile station UE and the radio base station eNB#1, and an S1 connection #1 is established between the radio base station eNB#1 and the mobile switching center MME, when the mobile station UE detects an RLF (failure in the RRC connection #1) in step S1001, then the mobile station UE performs a cell selection process in step S1002.

For example, when the mobile station UE detects an out-of synch state in the RRC connection #1 N310 times, and when the out-of-synch state is not resolved during a time from a timer T310 activates thereafter until the timer T310 expires, then the mobile station UE detects the RLF.

In step S1003, the mobile station UE transmits an "RRC Connection Re-establishment Request" to the radio base station eNB#2 that manages the cell #2 selected in the cell selection process.

In step S1004, when the radio base station eNB#2 determines that the context information of the mobile station UE corresponding to the "Physical Cell Identity", the "C-RNTI", and the "shortMAC-I" included in the received "RRC Connection Re-establishment Request" is not stored, then, in step S1005, the radio base station eNB#2 specifies the radio base station eNB#1 based on the above-described "Physical Cell Identity", and transmits the "Forward HO Request" (that may be called any other name such as "UE Context Request") including the above-described "C-RNTI" and the "shortMAC-I", to the radio base station eNB#1.

In step S1006, when the radio base station eNB#1 determines that the context information of the mobile station UE corresponding to the "C-RNTI" and the "shortMAC-I" included in the received "Forward HO Request" is stored, then, in step S1007, the radio base station eNB#1 transmits the "X2 HO Preparation" including the context information of the mobile station UE to the radio base station eNB#2 (if the radio base station eNB#1 determines that the context information of the mobile station UE is not stored, then the radio base station eNB#1 transmits a "Forward HO Reject" instead of the "X2 HO Preparation").

In step S1008, the radio base station eNB#2 transmits an "RRC Connection Re-establishment" to the mobile station UE.

In this case, when the "Forward HO Reject" is returned from the radio base station eNB#1, then the "RRC Connection Re-establishment Reject" is transmitted instead. As a result, the connection re-setting is ended unsuccessfully, and the mobile station UE releases the RRC connection and is changed to "RRC_IDLE state".

In step S1009, the mobile station UE transmits an "RRC Connection Re-establishment Complete" to the radio base station eNB#2.

In step S1010, the radio base station eNB#2 transmits an "X2 HO Preparation Ack" to the radio base station eNB#1, and in step S1011, the radio base station eNB#2 transmits the "S1 Path Switch" to the mobile switching center MME, and in step 1012, the radio base station eNB#2 transmits the "RRC Connection Reconfiguration" to the mobile station UE.

In step S1013, the mobile station UE transmits the "RRC Connection Reconfiguration Complete" to the radio base station eNB#2, and in step S1410, the mobile switching center MME transmits the "S1 Path Switch Ack" to the radio base station eNB#2.

This completes switching of the RRC connection #1 to the RRC connection #2 and switching of the S1 connection #1 to the S1 connection #2. In this case, the RRC connection #2 is an RRC connection established between the mobile station UE and the radio base station eNB#2, and the S1 connection #2 is an S1 connection established between the radio base station eNB#2 and the mobile switching center MME.

(Advantageous Effect of the Mobile Communication System According to the First Embodiment of the Present Invention)

According to the mobile station UE used in the mobile communication system according to the first embodiment of the present invention, even if the radio base station eNB#2 does not store the context information of the mobile station UE, it is possible to acquire the context information of the mobile station UE from the radio base station eNB#1, and thus, the mobile station UE can perform the connection re-establishment (re-connection) on the radio base station eNB#2 in which the context information of the mobile station UE is not stored.

(First Modification of the Present Invention)

Figure 10A:
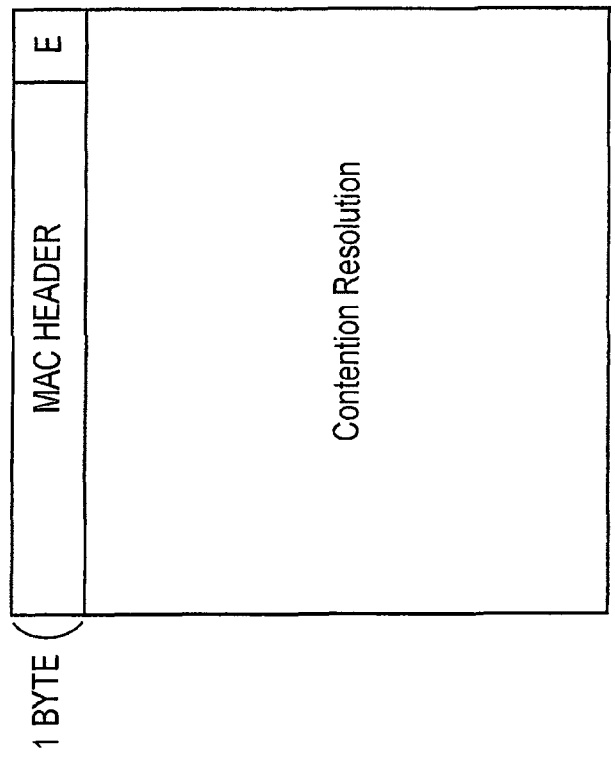
FIG. 10 is a diagram explaining the operation of the mobile communication system according to the first modification of the present invention.
Figure 10B:
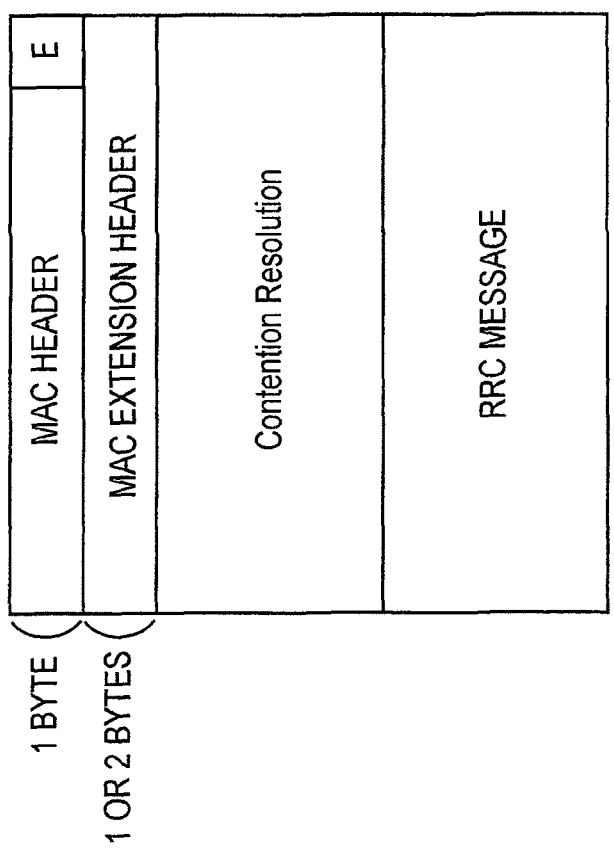
Figure 11:
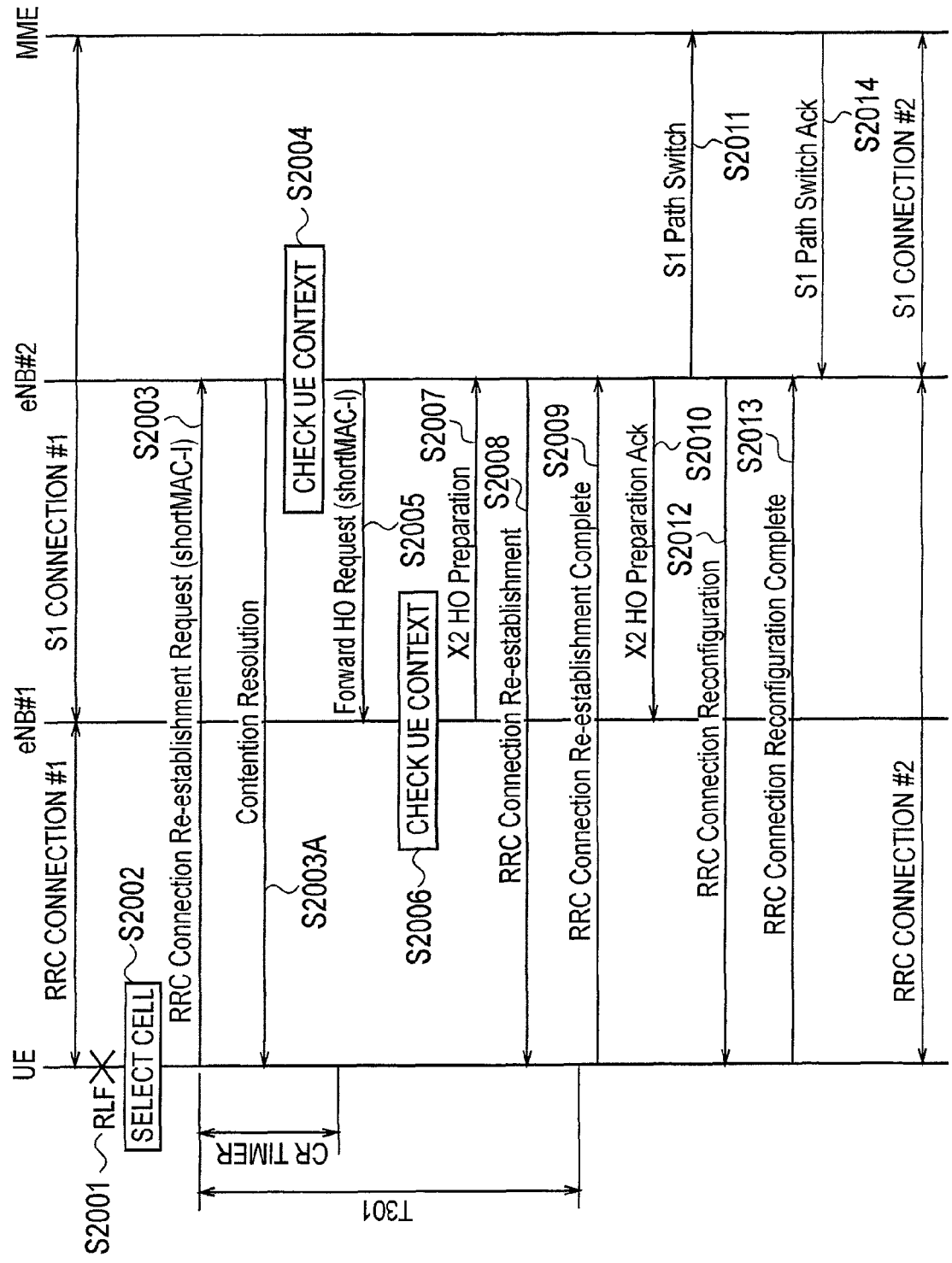
FIG. 11 is a sequence chart showing the operation of the mobile communication system according to the first modification of the present invention.
Figure 12:
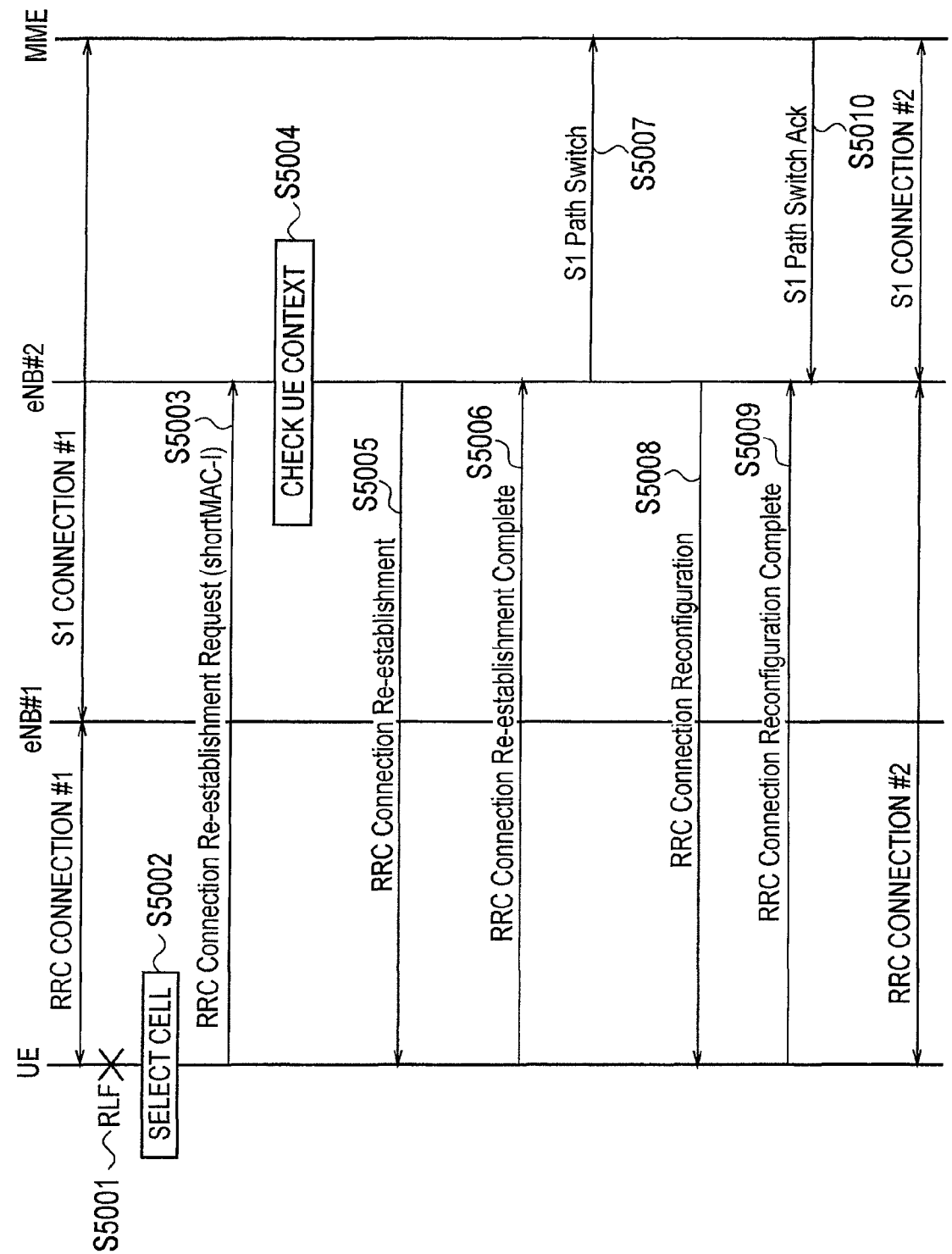
FIG. 12 is a sequence chart showing an operation of a conventional mobile communication system.

With reference to FIG. 9 through FIG. 11, a mobile communication system according to a first modification of the present invention will be explained. Hereinafter, the mobile communication system according to the first modification will be described while focusing on the difference in the mobile communication system according to the above-described first embodiment.

In the mobile communication system according to the first modification, the mobile station UE is configured to transmit the "RRC Connection Re-establishment Request" to the radio base station eNB#2 selected in the cell selection process by using a random access procedure.

Herein, with reference to FIG. 9 and FIG. 10, the above-described operation will be explained.

As illustrated in FIG. 9, in step S3001, the mobile station UE transmits a random access preamble to the radio base station eNB#2.

In step S3002, the radio base station eNB#2 transmits a random access response to the mobile station UE, in response to the received random access preamble. In this case, the radio base station eNB#2 transmits the random access response to the mobile station UE, via a PDCCH including an RA-RNTI.

In step S3003, the mobile station UE transmits an "RRC Connection Re-establishment Request" by using an uplink radio resource (UL Grant) designated by the random access response. An HARQ (Hybrid ARQ) process is applied in transmitting the "RRC Connection Re-establishment Request".

In step S3004, the radio base station eNB#2 transmits a "Contention Resolution", in response to the reception of the "RRC Connection Re-establishment Request".

In step S3005, the radio base station eNB#2 transmits an "RRC Connection Re-establishment", which is a response signal to the "RRC Connection Re-establishment Request". An HARQ process is applied in transmitting the "RRC Connection Re-establishment".

The MAC processing unit 14 of the radio base station eNB#2 is configured to transmit the "Contention Resolution" before a CR (Contention Resolutions) timer (predetermined timer) activated, when the "RRC Connection Re-establishment Request" is transmitted by the mobile station UE expires.

In this case, during the identical TTI (Transmission Time Interval), the MAC processing unit 14 of the radio base station eNB#2 may transmit the "Contention Resolution" in connection with the "RRC Connection Re-establishment", as illustrated in FIG. 10(*a*), or transmit separately the "Contention Resolution" and the "RRC Connection Re-establishment", as illustrated in FIG. 10(*b*).

Moreover, the MAC processing unit 14 of the radio base station eNB#2 is configured to copy the received "RRC Connection Re-establishment Request" in a field of the "Contention Resolution" in FIG. 10(*a*) and FIG. 10(*b*).

The mobile station UE is configured to firstly determine, according to the random access procedure, whether or not the "Contention Resolution" is included in control information transmitted via the PDCCH including a Temp-C-RNTI after transmitting the "RRC Connection Re-establishment Request".

The Temp-C-RNTI is a temporary C-RNTI (identifier of the mobile station UE in the cell) assigned by the random access response.

Specifically, the mobile station UE may be configured to determine whether the "Contention Resolution" is included in the control information without analyzing the MAC header and the MAC extension header on the assumption that the field of the "Contention Resolution" starts from a third or fourth byte, as illustrated in FIG. 10(*a*), or may be configured to determine whether or not the "Contention Resolution" is included in the control information without analyzing the MAC header on the assumption that the field of the "Contention Resolution" starts from a second byte, as illustrated in FIG. 10(*b*).

The HARQ is applied to the "Contention Resolution"; however, unlike the MAC process of the usual HARQ, the mobile station UE transmits a feedback of the HARQ Ack, only if it is confirmed that the "RRC Connection Re-establishment Request" that is transmitted by the mobile station UE itself is echoed back by the "Contention Resolution", because there is a possibility that a plurality of mobile stations UE conflicts as a result of simultaneous random access.

In other cases (in the case of HARQ Nack due to unsuccessful decoding and if the content of the echo back of the "Contention Resolution" does not match), the mobile station UE does not transmit an Ack/Nack feedback of the HARQ.

However, the feedback of the HARQ needs to be transmitted at a timing to satisfy an RTT (round trip time) during which the HARQ operates. Therefore, a requirement for a processing speed is stringent and a processing time for analyzing an MAC header cannot be taken.

Therefore, it is desired that the mobile station UE is configured to determine, without analyzing the MAC header, a bite position of the "Contention Resolution" to directly compare a bit string of the content of the echo back.

Hereinafter, with reference to FIG. 11, an operation of the mobile communication system according to the first modification will be described.

As illustrated in FIG. 11, in a state where the RRC connection #1 is established between the mobile station UE and the radio base station eNB#1, the S1 connection #1 is established between the radio base station eNB#1 and the mobile switching center MME, when the mobile station UE detects the RLF (failure in the RRC connection #1) in step S2001, then the mobile station UE performs the cell selection process in step S2002.

In step S2003, the mobile station UE transmits an "RRC Connection Re-establishment Request" to the radio base station eNB#2 that manages the cell #2 selected in the cell selection process.

At this time, in step S2003A, the radio base station eNB#2 transmits the "Contention Resolution" to the mobile station UE at an arbitrary timing before the CR timer expires.

Operations from steps S2004 to S2014 are identical to those from steps S1004 to S1014 illustrated in FIG. 8.

When the "RRC Connection Re-establishment" in step S2008 does not reach the mobile station UE before the timer T301 expires, then the mobile station UE determines that the setting of the RRC connection #2 in the cell #2 is unsuccessful. In such a case, the mobile station UE releases the RRC connection and is changed to the "RRC_IDLE state".

Hereinafter, an operation and an effect of the mobile communication system according to the first modification will be described.

In the mobile communication system according to the first embodiment of the present invention, when the radio base station eNB#2 receives the "RRC Connection Re-establishment Request" from the mobile station UE and does not store the context information of the mobile station UE, then it is needed to acquire the context information of the mobile station UE from the radio base station eNB#1.

Therefore, when the radio base station eNB#2 transmits the "RRC Connection Re-establishment" in connection with the "Contention Resolution", in the identical TTI, then the "Contention Resolution" does not reach the mobile station UE before the CR timer expires. As a result, even if the "RRC Connection Re-establishment Request" surely reaches the radio base station eNB#2, the random access procedure may be repeated.

Because of this reason, as in the mobile communication system according to the first modification, when the "Contention Resolution" is transmitted to the mobile station UE at an arbitrary timing by the radio base station eNB#2 before the CR timer expires, then such a problem can be solved.

In particular, in the case where the radio base station eNB#2 receives the "RRC Connection Re-establishment Request" from the mobile station UE does not store the context information of the mobile station UE, it is preferable to transmit the "Contention Resolution" to the mobile station UE at an arbitrary timing before the CR timer expires.

The above-mentioned characteristics of the embodiments may be expressed as follows:

A first aspect of the embodiments is summarized as a mobile communication method, including the steps of: (A) performing, at a mobile station UE which establishes an RRC connection #1 (first connection) in a cell #1 (first cell), a cell selection process upon detecting a failure (RLF) in the RRC connection #1; (B) transmitting, from the mobile station UE to a cell #2 (second cell) selected in the cell selection process, an "RRC Connection Re-establishment Request (connection re-establishment request signal)"; (C) determining, at a radio base station eNB#2 that manages the cell #2, whether or not to store context information of the mobile station UE in response to the "RRC Connection Re-establishment Request"; (D) acquiring, at the radio base station eNB#2, the context information of the mobile station UE from a radio base station eNB#1 that manages the cell #1, when determining that the context information of the mobile station UE is not stored; and (E) establishing, at the radio base station eNB#2 and the mobile station UE, an RRC connection #2 (second connection) in the cell #2 for the mobile station UE, based on the context information of the mobile station UE.

In the first aspect of the embodiment, the step (B) may include the steps of: (B1) transmitting, from the mobile station UE to radio base station eNB#2, a random access preamble; (B2) transmitting, from the radio base station eNB#2 to the mobile station UE, a random access response, in response to the received random access preamble; (B3) transmitting, from the mobile station UE, the "RRC Connection Re-establishment Request" by using a resource designated by the random access response; and (B4) transmitting, from the radio base station eNB#2, a "Contention Resolution (contention resolution signal)" in response to the reception of the "RRC Connection Re-establishment Request". In the step (B4), the radio base station eNB#2 may transmit the "Contention Resolution" separately from the "RRC Connection Re-establishment" that is a response signal to the "RRC Connection Re-establishment Request", before a CR timer (predetermined timer) activated in the step (B1) expires.

In the first aspect of the embodiment, the radio base station eNB#2 stores a "shortMAC-I (security parameter)" capable of uniquely specifying the mobile station UE and the context information of the mobile station UE in association with each other, and in the step (D), the radio base station eNB#2 may acquire the context information of the mobile station UE from the radio base station eNB#1, when it is determined that the context information of the mobile station UE corresponding to the "shortMAC-I" included in the "RRC Connection Re-establishment Request" is not stored.

A second aspect of the embodiment is summarized as a radio base station eNB#2 that manages the cell #2, including: a determination unit 13 configured to determine whether or not to store the context information of the mobile station UE in response to the "RRC Connection Re-establishment Request" destined to the cell #2 received from the mobile station UE wherein the mobile station UE has established the RRC connection #1 in the cell #1; an X2 processing unit 15 configured to acquire, when it is determined by the determination unit 13 that the context information of the mobile station UE is not stored, the context information of the mobile station UE from the radio base station eNB#1 that manages the cell #1; and an RRC processing unit 12 configured to establish the RRC connection #2 in the cell #2 for the mobile station UE in cooperation with the mobile station UE, based on the context information of the mobile station UE.

The second aspect of the embodiment may include an MAC processing unit 14 configured to transmit the random access response to the mobile station UE in response to the random access preamble received from the mobile station UE and to transmit a "Contention Resolution" in response to the receipt of the "RRC Connection Re-establishment Request" received from the mobile station by using a resource designated by the random access response. The MAC processing unit 14 may be configured to transmit, before the CR timer activated at the time of transmission of the "RRC Connection Re-establishment Request" by the mobile station UE expires, the "Contention Resolution" separately from the "RRC Connection Re-establishment" that is a response signal to the "RRC Connection Re-establishment Request".

The second aspect of the embodiment may include a UE context storage unit 11 configured to store a "shortMAC-I" uniquely specifying the mobile station UE and the context information of the mobile station UE in association with each other, and the RRC processing unit 12 may be configured to acquire, when it is determined that the context information of the mobile station UE corresponding to the "shortMAC-I" included in the "RRC Connection Re-establishment Request" is not stored, the context information of the mobile station UE from the radio base station eNB#1.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE or the radio base station eNB. As a discrete component, such a storing medium and processor may be arranged in the mobile station UE or the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication method, comprising the steps of:
   (A) performing, at a mobile station which establishes a first connection in a first cell, a cell selection process upon detecting a failure in the first connection;
   (B) transmitting, from the mobile station to a second cell selected in the cell selection process, a connection re-establishment request signal;
   (C) determining, at a radio base station that manages the second cell, whether or not stored context information of the mobile station exists, in response to the connection re-establishment request signal;
   (D) acquiring, at the radio base station that manages the second cell, the context information of the mobile station from a radio base station that manages the first cell, when determining that the context information of the mobile station is not stored; and
   (E) establishing, at the radio base station that manages the second cell and the mobile station, a second connection in the second cell for the mobile station, based on the context information of the mobile station, wherein
   the step (B) comprises the steps of:
   (B1) transmitting, from the mobile station to the radio base station that manages the second cell, a random access preamble;
   (B2) transmitting, from the radio base station that manages the second cell to the mobile station, a random access response, in response to the random access preamble;

(B3) transmitting, from the mobile station, the connection re-establishment request signal by using a resource designated by the random access response;

(B4) transmitting, from the radio base station that manages the second cell, a contention resolution signal without a connection re-establishment signal that is a response signal to the connection re-establishment request signal in response to the reception of the connection re-establishment request signal; and (B5) transmitting, from the radio base station that manages the second cell, the connection re-establishment signal in response to the reception of the connection re-establishment request signal; and in the step (B4), the radio base station that manages the second cell transmits the contention resolution signal separately from the connection re-establishment signal which is transmitted after the step (D).

2. A radio base station that manages a second cell, comprising:
 a determination unit that determines whether or not stored context information of a mobile station exists, in response to a connection re-establishment request signal destined to the second cell received from the mobile station, wherein the mobile station has established a first connection in a first cell;
 an acquiring unit that acquires, when it is determined by the determination unit that the context information of the mobile station is not stored, the context information of the mobile station from a radio base station that manages the first cell;
 an establishment unit that establishes a second connection in the second cell for the mobile station in cooperation with the mobile station, based on the context information of the mobile station, and
 a connection re-establishment request signal receiving unit that transmits a random access response to the mobile station in response to a random access preamble received from the mobile station, transmits a contention resolution signal without a connection re-establishment signal that is a response signal to the connection re-establishment request signal in response to the receipt of the connection re-establishment request signal received from the mobile station by using a resource designated by the random access response, and transmits the connection re-establishment signal; wherein
 the connection re-establishment request signal receiving unit transmits the contention resolution signal in response to the reception of the connection re-establishment request signal, separately from the connection re-establishment signal which is transmitted after acquiring the context information of the mobile station.

3. The radio base station according to claim 2, further comprising:
 a storage unit that stores a security parameter capable of uniquely specifying the mobile station and the context information of the mobile station in association with each other; wherein
 the acquiring unit acquires, when it is determined that the context information of the mobile station corresponding to the security parameter included in the connection re-establishment request signal is not stored, the context information of the mobile station from the radio base station that manages the first cell.

4. The mobile communication method according to claim 1, wherein
 the radio base station that manages the second cell stores a security parameter capable of uniquely specifying the mobile station and the context information of the mobile station in association with each other;
 in the step (D), the radio base station that manages the second cell acquires the context information of the mobile station from the radio base station that manages the first cell, when it is determined that the context information of the mobile station corresponding to the security parameter included in the connection re-establishment request signal is not stored.

* * * * *